US005833737A

United States Patent [19]
Tamura et al.

[11] Patent Number: 5,833,737
[45] Date of Patent: Nov. 10, 1998

[54] ENRICHMENT OF KRYPTON IN OXYGEN/ NITROGEN MIX GAS

[75] Inventors: Takaaki Tamura, Tokyo; Mikio Kumagai, Chiba, both of Japan

[73] Assignee: Institute of Research and Innovation, Tokyo, Japan

[21] Appl. No.: 859,042

[22] Filed: May 20, 1997

[30] Foreign Application Priority Data

May 20, 1996 [JP] Japan .................................... 8-148654

[51] Int. Cl.[6] .................................................. B01D 53/053

[52] U.S. Cl. .................................. 95/98; 95/101; 95/102; 95/105; 95/127

[58] Field of Search ......................... 95/97, 98, 100–105, 95/127

[56] References Cited

U.S. PATENT DOCUMENTS

| | | | |
|---|---|---|---|
| 3,751,878 | 8/1973 | Collins | 95/105 |
| 3,797,201 | 3/1974 | Tamura | 95/105 |
| 3,922,150 | 11/1975 | Yusa et al. | 95/127 X |
| 4,054,427 | 10/1977 | Schroeter et al. | 55/25 |
| 4,092,133 | 5/1978 | Kamiya et al. | 95/127 X |
| 4,314,828 | 2/1982 | Saito et al. | 95/97 |
| 4,369,048 | 1/1983 | Pence | 55/66 |
| 4,447,353 | 5/1984 | Pence et al. | 252/630 |
| 4,475,929 | 10/1984 | Fuderer | 95/97 |
| 4,512,780 | 4/1985 | Fuderer | 95/100 |
| 4,726,816 | 2/1988 | Fuderer | 95/98 |
| 4,790,858 | 12/1988 | Sircar | 95/101 |
| 4,816,041 | 3/1989 | Ringel et al. | 95/127 |

FOREIGN PATENT DOCUMENTS

| | | | |
|---|---|---|---|
| 0193716 | 9/1986 | European Pat. Off. | 95/101 |
| 0257493 | 3/1988 | European Pat. Off. | 95/101 |
| 0545559 | 6/1993 | European Pat. Off. | 95/100 |
| 0621069 | 10/1994 | European Pat. Off. | 95/98 |
| 54-3823 | 2/1979 | Japan . | |
| 61-274723 | 12/1986 | Japan | 95/127 |
| 63-131100 | 6/1988 | Japan | 95/127 |
| 1-234313 | 9/1989 | Japan | 95/97 |
| 2-149317 | 6/1990 | Japan . | |
| 2-284621 | 11/1990 | Japan | 95/98 |
| 3-181321 | 8/1991 | Japan . | |

OTHER PUBLICATIONS

Derwent Abstracts, AN 74–27766V, JP 48 091 500, Nov. 28, 1973.

Derwent Abstracts, AN 85–168114, JP 60 097 022, May 30, 1985.

D. T. Pence, et al., Work performed under contact AX–509991R, Science Applications, Inc., pp. 1–68, “A Design and Cost Estimate for the SRL Integrated Hot Off Gas Facility Using Selective Adsorption”, Jul. 1981.

D. M. Ruthven, et al., The Canadian Journal of Chemical Engineering, vol. 62, pp. 526–534, “Adsorptive Separation of Kr From $N_2$–Part I Adsorbent Screening Studies”, Aug. 1984.

F. H. Tezel, et al., The Canadian Journal of Chemical Engineering, vol. 68, pp. 268–277, “Adsorptive Separation of Kr From $N_2$–Part II. Development of a Pilot Unit”, Apr. 1990.

*Primary Examiner*—Robert Spitzer
*Attorney, Agent, or Firm*—Oblon, Spivak, McClelland, Maier & Neustadt, P.C.

[57] ABSTRACT

Krypton present in a trace amount in a gaseous oxygen/ nitrogen mixture is effectively enriched by an adsorption/ desorption process of the pressure variation mode using a system including at least three fixed bed adsorption columns packed with hydrogenated mordenite. At the end of adsorption operation in one column, a desorbed gas from another column is fed to the one column under substantially the same pressure as the pressure during adsorption operation for fully washing the one column. Thereafter, the one column is subject to desorption operation.

7 Claims, 1 Drawing Sheet

ENRICHMENT OF KRYPTON IN OXYGEN/ NITROGEN MIX GAS

BACKGROUND OF THE INVENTION

This invention relates to a method for enriching krypton in a gaseous oxygen/nitrogen mixture.

Steps of reprocessing spent uranium fuel used in nuclear power generation release a gas of approximate air composition containing radioactive krypton 85 with a half life of 10.7 years. Krypton 85 is contained in this gas in a very low concentration while large amounts of NO and $NO_2$ are co-present. Many attempts have been made to separate and enrich krypton to high purity from the off-gas of such composition. See D. T. Pence and B. E. Kirstein: Work performed under contract AX-509991R, Science Application Inc. (1981), D. M. Ruthven, F. H. Tezel and J. S. Devgan: Canadian J. Chem. Eng., Vol. 62, 526 (1984), and F. H. Tezel, D. M. Ruthven and H. A. Boniface: Canadian J. Chem. Eng., Vol. 68, 268 (1990).

These proposals use hydrogen type synthetic mordenite as an adsorbent. In principle, more or less krypton enrichment is possible since krypton is more strongly adsorbed than nitrogen and oxygen. One problem is a low enrichment factor at a temperature near room temperature. Owing to a very small difference in adsorbability between nitrogen and krypton, a single adsorption/desorption cycle can merely achieve an enrichment factor of about 1.5 to 2 as reported in D. M. Ruthven, F. H. Tezel and J. S. Devgan: Canadian J. Chem. Eng., Vol. 62, 526 (1984). In addition, due to a small adsorption quantity, no satisfactory separation is accomplished unless adsorption is done at a low temperature of −80° C. or lower. It was thus proposed to employ an adsorption/desorption process of the temperature variation mode of effecting adsorption at −80° C. or lower and desorption at elevated temperature (see D. T. Pence and B. E. Kirstein: Work performed under contract AX-509991R, Science Application Inc. (1981)) or to carry out adsorption separation by an elution process of passing a large volume of helium gas through adsorption columns for multi-stage adsorption/desorption (see F. H. Tezel, D. M. Ruthven and H. A. Boniface: Canadian J. Chem. Eng., Vol. 68, 268 (1990)).

These methods require a system which is complex when considered as an industrial method for processing a large volume of gas. The complex system adds to the installation investment and requires an increased operating cost.

SUMMARY OF THE INVENTION

An object of the present invention is to provide a method for effectively enriching krypton present in a trace amount in a gaseous oxygen/nitrogen mixture by an adsorption/desorption process of the pressure variation mode.

Another object of the present invention is to provide a method for enriching krypton in a gaseous oxygen/nitrogen mixture which can be practiced on an industrial scale.

We studied various separative enrichment methods, but none of them were practical because of low enrichment factors. Being interested in an adsorption/desorption process of the pressure variation mode wherein the pressure for adsorption operation is higher than the pressure for desorption operation as described in F. H. Tezel, D. M. Ruthven and H. A. Boniface: Canadian J. Chem. Eng., Vol. 68, 268 (1990), we have found specific means that enables the process to have a fully high separative power at atmospheric temperature and pressure without a need for heating and cooling steps.

According to the method of the invention, krypton in a gaseous oxygen/nitrogen mixture is enriched by an adsorption/desorption process of the pressure variation mode using a system including at least three fixed bed adsorption columns packed with hydrogenated mordenite. At the end of adsorption operation in one column, a desorbed gas from another column is fed to the one column under substantially the same pressure as the pressure during adsorption operation for fully washing the one column. Thereafter, the one column is subject to desorption operation.

In one preferred embodiment of the invention, the gaseous oxygen/nitrogen mixture contains 0.001 to 0.1% by volume of krypton, and krypton is enriched by a volume factor of about 10 to about 1,000.

Japanese Patent Publication (JP-B) No. 3823/1979 discloses a method for continuously separating and recovering a difficultly adsorbable component and an easily adsorbable component in high purity from a gas mixture by feeding a gas mixture into an adsorption column packed with an adsorbent for adsorbing an easily adsorbable component and recovering a difficultly adsorbable component, and desorbing and recovering the adsorbed component under vacuum, characterized in that prior to the feeding of a gas mixture, a purer gas of the same component as the difficultly adsorbable component is introduced into the column until substantially the same pressure as the pressure during adsorption is established in the column, and prior to the desorption, a purer gas of the same component as the easily adsorbable component is introduced into the column under substantially the same pressure as the pressure during adsorption for washing the column. The adsorbent used is obtained by grinding naturally occurring tuff to an appropriate particle size, heating the particles at about 350° to 700° C. for drying, and activating the particles. When air is introduced, nitrogen as an easily adsorbable component and oxygen as a difficultly adsorbable component are separately recovered. In this patent publication, however, no reference is made to the enrichment of krypton which is present in a trace amount in an oxygen/nitrogen gas mixture.

BRIEF DESCRIPTION OF THE ACCOMPANYING DRAWINGS

The only FIGURE, FIG. 1 is a diagram showing one exemplary system used in the method of the invention.

DETAILED DESCRIPTION OF THE INVENTION

Figure 1:
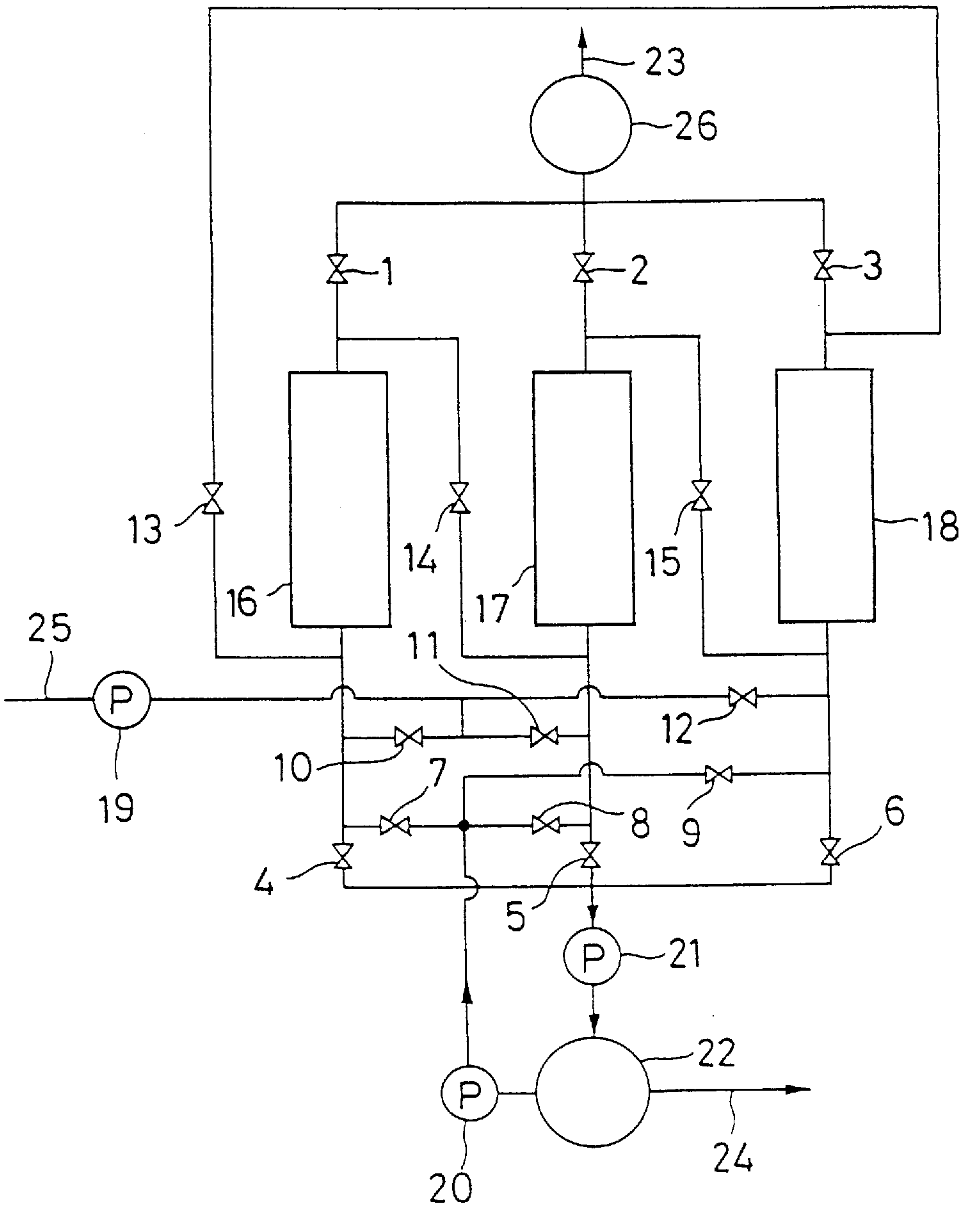

A gas to be treated according to the invention is a gaseous oxygen/nitrogen mixture containing krypton, typically air containing krypton. Krypton-containing air is fed to a system including at least three fixed bed adsorption columns packed with hydrogenated mordenite wherein an adsorption/desorption process of the pressure variation mode is carried out. When one column has finished adsorption operation, it is subject to desorption under vacuum. The present invention avoids immediately subjecting the one column to desorption. Instead, a desorption gas resulting from desorption operation in another column is fed into the one column under substantially the same pressure as the pressure during adsorption operation for fully washing the one column. Thereafter, the one column is subject to desorption operation under vacuum.

With this operation sequence, a satisfactorily high enrichment factor of krypton is obtained even when an adsorption/desorption process is carried out at room temperature (about 15° C. to about 35° C.).

The gaseous oxygen/nitrogen mixture containing krypton to be treated according to the invention is typically an off-gas of approximate air composition containing radioactive krypton 85 which is released in the reprocessing of spent uranium fuel used in nuclear power generation. By an appropriate pretreatment, NOx, water, $CO_2$, and Xe are removed from the gas. The thus pretreated gas contains about 0.001% to 0.1% by volume of krypton. The remainder is nitrogen and oxygen while the ratio of nitrogen to oxygen varies with processing conditions of preceding stages.

When such a gaseous mixture is treated by an adsorption/desorption process, there are recovered a treated off-gas whose krypton volume concentration has been reduced to 1/10 or less of the volume concentration prior to treatment and a krypton enriched gas having krypton enriched by a volume factor of about 10 to about 1,000. The treated off-gas which is substantially free of krypton can be released into the air without further treatment. The krypton enriched gas must be stored in an appropriate form because krypton isotopes emitting beta rays are contained therein.

According to the present invention, a fixed bed adsorption column is packed with hydrogenated mordenite as an adsorbent. The hydrogenated mordenite used herein may be either hydrogenated natural mordenite obtained by hydrogenating naturally occurring tuff or hydrogenated synthetic mordenite. Naturally occurring tuff usually contains $SiO_2$, $Al_2O_3$, and $H_2O$ as major components and about 1% to about 10% by weight of alkali and alkaline earth metal oxides. Hydrogenation may be carried out by acid or ammonia treatment as described in JP-A 149317/1990 and 181321/1991. As the hydrogenated synthetic mordenite, commercially available ones, for example, HSZ-620HOD by Toso K. K. may be used.

Prior to use, hydrogenated mordenite is heated at a temperature of 350° to 700° C., preferably 400° to 600° C. for drying. This is because the presence of adhesive moisture and water of crystallization can degrade the adsorptive power.

The gaseous mixture to be treated should also preferably be free of water as well as $CO_2$ which can degrade the adsorptive power. These components do not give rise to a problem since they have been removed from the gaseous mixture by the pretreatment as previously mentioned.

The method of the invention relies on an adsorption/desorption process of the pressure variation mode wherein pressure is varied between adsorption and desorption operations. In practice, the pressure during adsorption operation is greater than the pressure during desorption operation. More particularly, adsorption operation is carried out under atmospheric pressure (about 1 atm.) and desorption operation is carried out under a vacuum of about 0.01 to 0.3 atm. Alternatively, adsorption operation is carried out under a super-atmospheric pressure of about 2 to 20 atm. and desorption operation is carried out under atmospheric pressure. The former is preferred for safety in the isolation of radioactive gas because maintaining the system under reduced pressure reduces potential leakage.

At the end of adsorption operation in one column, a desorption gas resulting from desorption in another column is fed into the one column under substantially the same pressure as the pressure during adsorption operation for fully washing the one column prior to the start of desorption operation in one column. More particularly, since adsorption operation is carried out under atmospheric pressure, the one column may be washed under approximately atmospheric pressure. The desorbed gas is fed into the one column until the column is full of the gas. It is understood that when adsorption operation is carried out under a certain pressure, the column is washed by feeding a desorbed gas under approximately the same pressure.

In order to acknowledge that the column is full of the desorbed gas, the operating time is predetermined by carrying out gas filling operation under the same conditions to determine the time taken until the column is full of the gas. The desorbed gas is fed into the column until the column is completely purged with the desorbed gas. The amount of purging gas may be properly determined in accordance with a gas purity and percent gas recovery.

In the practice of the invention, the system includes at least three, preferably three or four, most preferably three fixed bed adsorption columns. The reason why the system includes at least three adsorption columns is to prevent krypton from breaking through and escaping into the discharge gas delivered out of the system. A single column or dual column system cannot prevent such break-through and escape of krypton.

Referring to FIG. 1, there is illustrated a krypton enriching system according to one embodiment of the invention. The system shown in FIG. 1 is a triple column system including three fixed bed adsorption columns.

The system includes selectively openable and closable valves 1 to 15 and three fixed bed adsorption columns or towers 16, 17 and 18 each packed with hydrogenated mordenite. The fixed bed adsorption columns are often referred to as columns for simplicity sake.

The system also includes a feed pump 19 for feeding an input gas containing krypton, a pump 20 for feeding a desorbed gas upon washing, and a vacuum pump 21 for establishing a vacuum for desorption.

The system further includes a gas tank 22 for reserving an output gas which is air containing concentrated krypton, an outlet 24 for discharging the output gas, an inlet 25 for the input gas, a tank 26 for temporarily reserving exit gases from the respective columns, and a discharge outlet 23 for discharging the exit gas from which krypton has been removed. These elements are connected as shown in FIG. 1.

The valves 1 to 15 are opened and closed in accordance with the schedule of operating cycle Nos. 1 to 9 shown in Table 1 wherein "+" and "−" designate that the valve is opened and closed, respectively.

TABLE 1

| | Operating cycle | | | | | | | | |
|---|---|---|---|---|---|---|---|---|---|
| Valve | No. 1 | No. 2 | No. 3 | No. 4 | No. 5 | No. 6 | No. 7 | No. 8 | No. 9 |
| 1 | − | − | − | + | + | + | − | − | − |
| 2 | − | − | − | − | − | − | + | + | + |
| 3 | + | + | + | − | − | − | − | − | − |
| 4 | + | + | + | − | − | − | − | − | − |
| 5 | − | − | − | + | + | + | − | − | − |
| 6 | − | − | − | − | − | − | + | + | + |
| 7 | − | − | − | − | − | − | − | − | + |
| 8 | − | − | + | − | − | − | − | − | − |
| 9 | − | − | − | − | − | + | − | − | − |
| 10 | − | − | − | + | + | − | − | − | |
| 11 | − | − | − | − | − | − | + | + | − |
| 12 | + | + | − | − | − | − | − | − | − |
| 13 | − | − | − | − | − | + | − | − | − |
| 14 | − | − | − | − | − | − | − | − | + |
| 15 | − | − | + | − | − | − | − | − | − |

In operating cycle Nos. 1, 4, and 7, supply of input gas and back washing with effluent gas are concurrently carried out.

Through these operating cycles, the steps of back washing from the top with krypton-free effluent gas, supply of input gas, internal washing with desorbed gas, and vacuum desorption are sequentially repeated in each column, achieving efficient enrichment of krypton.

Desorption takes place in the column 16 during operating cycle Nos. 1, 2 and 3, in the column 17 during operating cycle Nos. 4, 5 and 6, and in the column 18 during operating cycle Nos. 7, 8 and 9.

During operating cycle Nos. 1 and 2, the column 16 is operating for desorption, the column 17 is quiescent, and the column 18 is operating for adsorption of krypton while receiving the input gas. It is noted that during operating cycle No. 1, supply of input gas and back washing from the top with the effluent gas are concurrently carried out until the pressure in the column 18 reaches the adsorption pressure. Similarly, the same operation takes place in the column 16 during operating cycle No. 4 and in the column 17 during operating cycle No. 7.

During operating cycle No. 3, the column 16 is operating for desorption, and the gas in the gas tank 22 is pumped by the pump 20 to the column 17 through the valve 8 whereby the column 17 is washed with the krypton enriched gas. During this washing cycle, the gas which is discharged from the other end of the column 17 after krypton, etc. have been somewhat adsorbed is fed to the column 18 through the valve 15 since the valve 2 is closed and the valve 3 is open. Even if washing of the column 17 is thoroughly carried out until the effluent gas from the column 17 reaches the same composition as the krypton enriched gas from the gas tank 22, that gas can be effectively utilized for preliminarily washing the column 18.

When the output gas of the column 17 during the washing cycle reaches the same composition as the krypton enriched gas from the gas tank 22, the system is changed to operating cycle Nos. 4 and 5. The column 17 is switched to desorption operation whereupon the krypton enriched gas which krypton has been adsorbed is transferred to the tank 22 by means of the pump 21. A part of the krypton enriched gas is used for washing of the column 18 in the subsequent cycle (operating cycle No. 6) and the remainder is taken out as a product gas through the outlet line 24.

Thereafter, as in the preceding cycles, during operating cycle No. 6, the column 18 is washed and the column 16 is preliminarily washed at the same time. During operating cycle No. 9, the column 16 is washed and the column 17 is preliminarily washed at the same time.

For switching of the operating cycle, a switching interval is previously determined from the composition and flow rate of the input gas, etc., and the cycle is switched at the predetermined intervals.

TABLE 2

| | Operating cycle | | | | | | | | |
|---|---|---|---|---|---|---|---|---|---|
| Valve | No. 1 | No. 2 | No. 3 | No. 4 | No. 5 | No. 6 | No. 7 | No. 8 | No. 9 |
| 1 | – | – | – | + | + | + | – | – | – |
| 2 | – | – | – | – | – | – | + | + | + |
| 3 | + | + | + | – | – | – | – | – | – |
| 4 | + | + | + | – | – | – | – | – | – |
| 5 | – | – | – | + | + | + | – | – | – |
| 6 | – | – | – | – | – | – | + | + | + |
| 7 | – | – | – | – | – | – | – | – | + |
| 8 | – | – | + | – | – | – | – | – | – |
| 9 | – | – | – | – | – | + | – | – | – |
| 10 | – | – | – | – | + | – | – | – | – |
| 11 | – | – | – | – | – | – | – | + | – |
| 12 | – | + | – | – | – | – | – | – | – |
| 13 | – | – | – | – | – | + | – | – | – |
| 14 | – | – | – | – | – | – | – | – | + |
| 15 | – | – | + | – | – | – | – | – | – |

In operating cycle Nos. 1, 4, and 7, back washing with effluent gas is carried out.

The valves other than the valves 10, 11, and 12 are manipulated as shown in Table 2. The valve 10 is closed in operating cycle No. 4 until the pressure in the column 16 reaches the adsorption pressure, and then kept open during operating cycle Nos. 5 and 6. The valve 11 is closed in operating cycle No. 7 until the pressure in the column 17 reaches the adsorption pressure, and then kept open during operating cycle Nos. 8 and 9. Similarly, the valve 12 is closed in operating cycle No. 1 until the pressure in the column 18 reaches the adsorption pressure, and then kept open during operating cycle Nos. 2 and 3. This operation is known as feedback operation and effective for increasing the percent recovery of krypton.

In this way, the output gas containing concentrated krypton is reserved in the gas tank 22 and the exit gas from which krypton has been removed is reserved in the gas tank 26.

Although the embodiment shown in FIG. 1 has been described, various modifications may be made thereto without departing from the scope of the invention. For example, the number of fixed bed adsorption columns may be increased to four. It is acceptable to carry out adsorption under pressure and desorption under atmospheric pressure.

EXAMPLE

Examples of the invention are given below by way of illustration and not by way of limitation.

Example 1

A system including three fixed bed adsorption columns as shown in FIG. 1 was used. Each of the columns 16 to 18 had a diameter of 17 mm and a length of 900 mm and was packed with 122 grams of an adsorbent. The adsorbent used herein was hydrogenated synthetic mordenite HSZ-620HOD (manufactured by Toso K.K.) which was dried by heating at 500° C.

Air containing 0.01% by volume of krypton as the input gas was fed from the inlet 25 at a rate of 1 liter/min. while the operating cycle was changed over at intervals of 1 minute in accordance with the schedule shown in Table 1. The system was operated to adjust the flow rate of the pump 20 such that the gas tank 22 was substantially emptied of the desorbed gas at the end of operating cycle Nos. 2, 4 and 6. In the desorption step, evacuation was done to an ultimate vacuum of 0.05 atm. and krypton enriched gas was taken out of the system at a rate of 15 cc/min. The krypton enriched gas contained 0.33% by volume of krypton while the exit gas taken out from the outlet 23 contained less than 0.001% by volume of krypton.

Example 2

The procedure of Example 1 was repeated except that hydrogenated naturally occurring mordenite was used as the adsorbent. The krypton enriched product gas contained 0.40% by volume of krypton. The krypton enriched product gas was taken out from the outlet 24 at a rate of 12 cc/min. The krypton concentration of the exit gas taken out from the outlet 23 was less than 0.001% by volume as in Example 1.

It is noted that the hydrogenated naturally occurring mordenite was obtained by hydrogenating naturally occurring tuff. More particularly, the raw material was naturally occurring tuff from Akita, Japan, which contained $SiO_2$, $Al_2O_3$, and $H_2O$ as major components and 1 to 10% by weight of alkali and alkaline earth metal oxides, and showed an X-ray diffraction pattern as shown in Table 3. The tuff was ground and classified. A fraction that passed a 6 to 10 mesh screen was collected, repeatedly treated with hydrochloric acid or nitric acid for removing alkali metals and alkaline earth metals, hydrogenated and heated at 500° C. for drying.

TABLE 3

| Interplanar spacing A | Line intensity $10 \times (I/I_0)$ | Interplanar spacing A | Line intensity $10 \times (I/I_0)$ |
|---|---|---|---|
| 13.9 ± 0.1 | 2 | 3.23 ± 0.03 | 6 |
| 9.1 ± 0.1 | 4 | 3.10 ± 0.03 | 0–1 |
| 6.6 ± 0.1 | 4 | 2.90 ± 0.03 | 3 |
| 6.5 ± 0.1 | 2 | 2.85 ± 0.03 | 0–2 |
| 6.1 ± 0.1 | 2 | 2.71 ± 0.03 | 1 |
| 5.83 ± 0.05 | 2 | 2.58 ± 0.03 | 1 |
| 4.55 ± 0.05 | 2 | 2.53 ± 0.03 | 2 |
| 4.30 ± 0.10 | 0–5 | 2.49 ± 0.03 | 0–4 |
| 4.26 ± 0.10 | 0–2 | 2.47 ± 0.03 | 0–3 |
| 4.08 ± 0.10 | 0–4 | 2.45 ± 0.03 | 0–2 |
| 4.05 ± 0.10 | 0–6 | 2.04 ± 0.03 | 2 |
| 4.01 ± 0.05 | 7 | 1.96 ± 0.03 | 1 |
| 3.85 ± 0.03 | 2 | 1.88 ± 0.02 | 1 |
| 3.81 ± 0.10 | 0–4 | 1.82 ± 0.02 | 1 |
| 3.77 ± 0.05 | 1 | 1.82 ± 0.02 | 0–2 |
| 3.48 ± 0.03 | 10 | 1.79 ± 0.02 | 1 |
| 3.40 ± 0.03 | 5 | 1.53 ± 0.02 | 1 |
| 3.35 ± 0.10 | 0–8 | | |

Comparative Example 1

A column having a diameter of 17 mm and a length of 900 mm was packed with 122 grams of the same adsorbent as used in Example 1. The packed column was evacuated to a vacuum of 0.05 atm. at room temperature (15° C.). By feeding dry air into the column from its top and air containing 0.01% by volume of krypton into the column from its bottom at the same time, atmospheric pressure was established within the column. Subsequently, air containing 0.01% by volume of krypton was continuously fed under atmospheric pressure as the input gas into the column from its bottom. At the time when the krypton concentration of the effluent gas from the top reached substantially the same as the input gas fed from the bottom, the supply of the input gas was interrupted for switching to desorption operation. When the column was evacuated from the bottom until a vacuum of 0.05 atm. was reached in the column, there was collected 0.7 liter of discharge gas under atmospheric pressure, which contained 0.017% by volume of krypton.

Comparative Example 2

The procedure of Comparative Example 1 was repeated except that the same adsorbent as in Example 2 was used. The krypton concentration of the discharge gas was 0.018% by volume.

The advantage of the invention is evident from the results of Examples 1 and 2 and Comparative Examples 1 and 2. In Comparative Examples 1 and 2 wherein no washing was done prior to desorption operation, krypton gas was enriched by a factor of about 2. In Examples 1 and 2, krypton gas was enriched by a factor of about 30 to about 40.

According to the invention, krypton present in a trace amount in an off-gas containing nitrogen and oxygen can be effectively enriched at approximately room temperature by varying the pressure for adsorption and desorption. The invention eliminates a need for means for cooling for adsorption and heating for desorption. A compact system can be employed for practicing the method.

Japanese Patent Application No. 148654/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for enriching krypton in a gaseous oxygen/nitrogen mixture by an adsorption/desorption process of the pressure variation mode using a system including at least three fixed bed adsorption columns packed with hydrogenated mordenite, the method comprising the steps of:

at the end of adsorption operation in one column, feeding a desorbed gas from another column to said one column under substantially the same pressure as the pressure during adsorption operation for fully washing said one column, and thereafter, subjecting said one column to desorption operation, and wherein the adsorption operation is not accompanied by means for cooling and the desorption operation is not accompanied by means for heating.

2. The method of claim 1 wherein the gaseous oxygen/nitrogen mixture contains 0.001 to 0.1% by volume of krypton.

3. The method of claim 2 wherein krypton is enriched by a volume factor of about 10 to about 1,000.

4. The method of claim 3, wherein the adsorption/desorption process is carried out between about 15° C. to about 35° C.

5. The method of claim 1 wherein the adsorption operation is carried out under atmospheric pressure and the desorption operation is carried out under a vacuum of about 0.01 to 0.3 atm.

6. The method of claim 1 wherein the adsorption operation is carried out under a super-atmospheric pressure of about 2 to 20 atm and the desorption operation is carried out under atmospheric pressure.

7. The method of claim 1 wherein three fixed bed adsorption columns are used.

* * * * *